UNITED STATES PATENT OFFICE.

SIDNEY LYON SMITH, OF BUNHILL ROW, AND THOMAS HARDEN, OF FULHAM, ENGLAND.

JOINTING OF CABLES, PIPES, RODS, AND THE LIKE, AND IN A FLUX THEREFOR.

No. 868,498.      Specification of Letters Patent.      Patented Oct. 15, 1907.

Application filed August 31, 1906. Serial No. 332,871.

*To all whom it may concern:*

Be it known that we, SIDNEY LYON SMITH and THOMAS HARDEN, subjects of the King of Great Britain, residing, respectively, at St. Paul's Vicarage, Bunhill Row, and 62 Hurlingham Road, Fulham, both in the county of London, in England, have invented new and useful Improvements in the Jointing of Cables, Pipes, Rods, and the Like and in a Flux Therefor, of which the following is a specification.

Our invention relates to improvements in the jointing of lead covered cables, pipes, rods, and the like for all purposes and in a flux therefor.

As the result of experiment we have discovered a means of avoiding the disadvantage attendant upon the methods generally used, and have invented a mode of jointing which is widely applicable.

It is well known that pure lead, which is the most suitable material for making the class of joints to which this specification has reference, will not as it cools from a molten state adhere to other metal surface such as lead, brass, copper, zinc or bronze. Of the methods of jointing generally used that of the wiped joint surmounts this difficulty by the admixture of tin with the lead used, and by the use of some substance usually tallow to form with the tin a flux which may cause the two surfaces to adhere. In other methods this result is obtained by preliminary tinning described. In carrying our invention into practice, we make lead joints by means of a new flux which we manufacture as follows:—In order to obtain the best results we take—stearin three ounces, vaseline four ounces, methylated spirit one tablespoon full. These are melted together and stirred until thoroughly amalgamated. This composition is spread evenly, and as thinly as possible upon a sheet of tin foil weighing five ounces or thereabout to the square foot, and preferably another sheet of foil is then carefully pressed down upon the first, making a sandwich which may be freely rolled, cut into strips or otherwise handled and such coated single sheet or sandwich will be hereinafter referred to as our flux. If this sandwich is placed in contact with a surface of suitable metal and molten lead is poured thereon the lead as it cools will alloy with and adhere to the metal surface. Though this particular flux has been found the best for practical use by us, it may be modified. The number of sheets of tinfoil could undoubtedly be altered or their thickness varied.

In the jointing of the lead covering of electric cables we carry our invention into practice preferably as follows:—The lead covering of the ends of the two lengths of electric cable to be joined are scraped to insure a clean surface, the conductors within the lead covering having been joined and insulated in the ordinary way, such insulation is encircled by asbestos or other suitable heat resisting material. Our flux is then wrapped round the scraped ends of the lead covering of the cable and a mold of suitable size and of the description referred to in Messrs. Tyers & Barnsdale's specification No. 4300, of 1891, is affixed thereto, the parings off the ends of the lead covering of the cable and other scrap lead is melted and poured into the mold, the lead of the cable and the molten lead poured into the mold uniting by the agency of the flux compound thus forming a sleeve over the insulated joint of the conductor and by the perfect alloying of the molten lead with the ends of the lead covering of the two lengths of cable continuity of the lead sheathing of the cable is insured. The molten lead rapidly cools and the mold can be removed in a few moments after use and no filling in of the sleeve with compound or oil is necessary as in the process now in use.

In the jointing of pipes rods and the like our practice is preferably as follows:—The ends of the pipes tubes or rods to be joined are scraped and butted together, our flux is wrapped round the scraped ends and a mold of a suitable size is affixed to the parts to be joined and molten lead poured in as before described, thus saving the cost of plumber's metal and the making of a cupped joint which is a necessary preliminary to the making of a wiped joint in an ordinary pipe.

What we claim, and desire to secure by Letters Patent of the United States, is—

1. A flux composed of stearin, vaseline, and methylated spirit, with tinfoil.

2. An article of manufacture comprising a plurality of layers of tinfoil inclosing between them a composition of matter comprising stearin, vaseline, and methylated spirit.

In testimony whereof we have signed our names to this specification in the presence of two subscribing witnesses.

SIDNEY LYON SMITH.
                 THOMAS HARDEN.

Witnesses:
    JOHN R. N. SEELY,
    THOS. C. CHAMBERLAIN.